(No Model.) 3 Sheets—Sheet 1.
H. H. HICKS.
HARVESTER REEL.
No. 332,079. Patented Dec. 8, 1885.
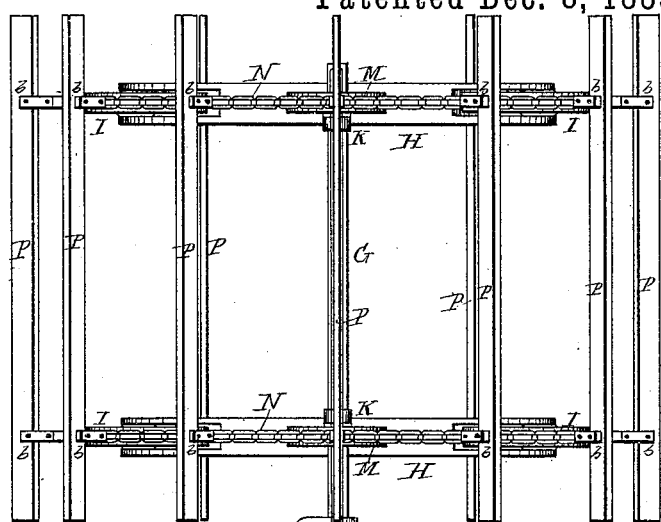
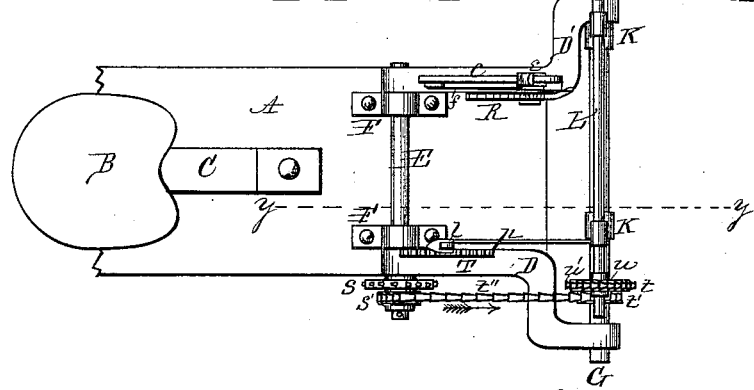
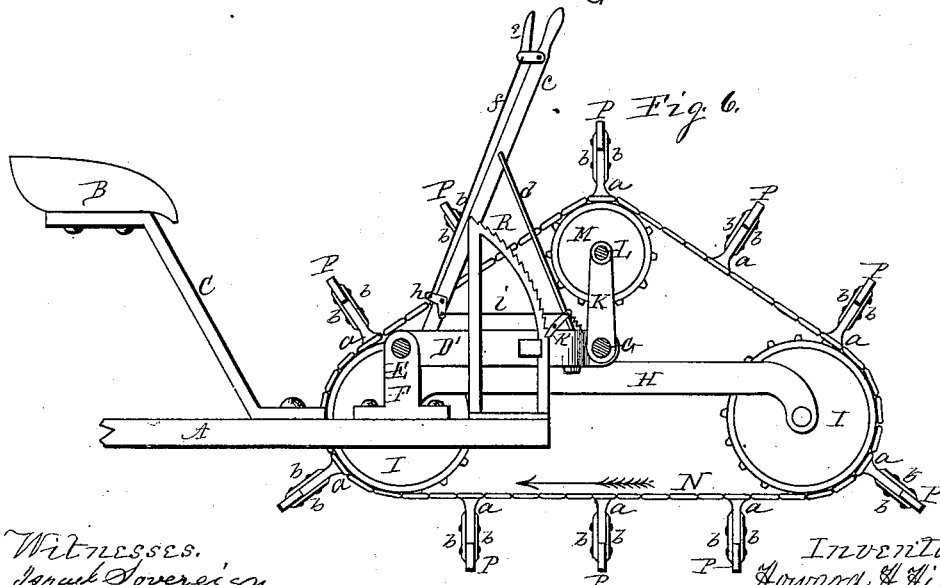
Witnesses.
Samuel Sovereign
A. O. Behel
Inventor.
Howard H. Hicks
Per Jacob Behel
Atty.

(No Model.) 3 Sheets—Sheet 2.
H. H. HICKS.
HARVESTER REEL.

No. 332,079. Patented Dec. 8, 1885.

Witnesses.
Israel Sovereign
A. O. Behel

Inventor.
Howard H. Hicks.
Per Jacob Behel,
Atty.

(No Model.)  3 Sheets—Sheet 3.
H. H. HICKS.
HARVESTER REEL.
No. 332,079. Patented Dec. 8, 1885.
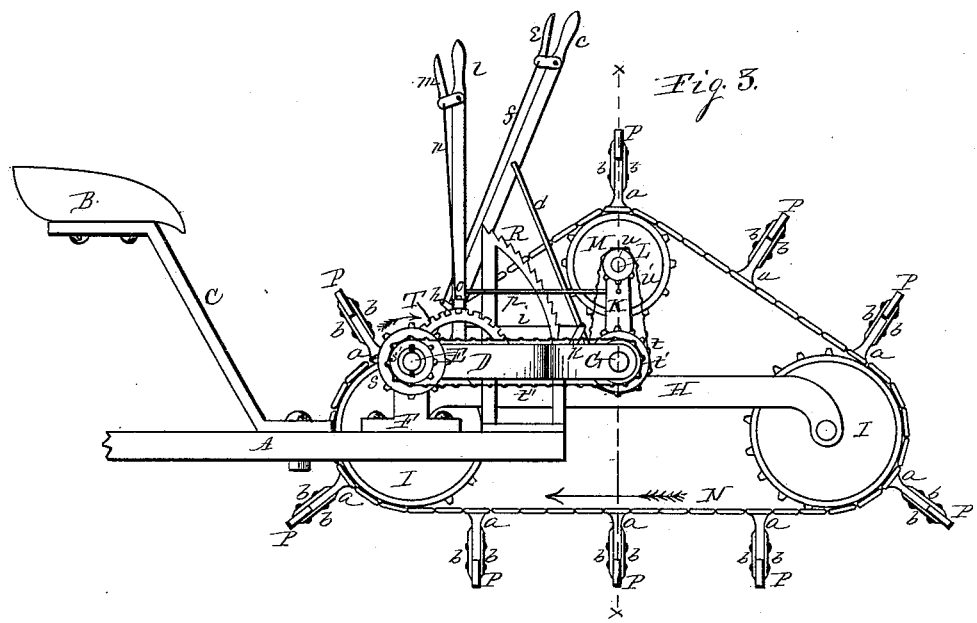
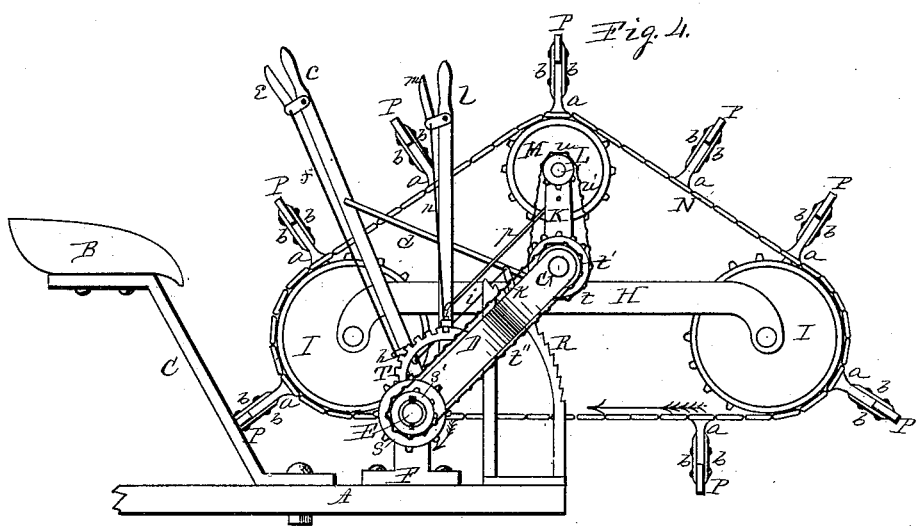
Witnesses.
Israel Sovereign
A. O. Behel
Inventor
Howard H. Hicks.
Per Jacob Behel
Atty.

UNITED STATES PATENT OFFICE.

HOWARD H. HICKS, OF ROCKFORD, ILLINOIS.

HARVESTER-REEL.

SPECIFICATION forming part of Letters Patent No. 332,079, dated December 8, 1885.

Application filed April 14, 1884. Serial No. 127,809. (No model.)

*To all whom it may concern:*

Be it known that I, HOWARD H. HICKS, a citizen of the United States, residing in the city of Rockford, in the county of Winnebago and State of Illinois, have invented a new and useful Harvester-Reel, of which the following is a specification.

This invention relates to reels employed in harvesting-machines to gather the grain to the cutters and deposit the cut grain on the harvester-platform. Its object is to produce a more efficient reel for the general purpose of a harvester, and especially capable of better results in harvesting lodged or down grain.

To this end I have designed and constructed the harvester-reel represented in the accompanying drawings, and which will be hereinafter more fully described.

Figure 2:
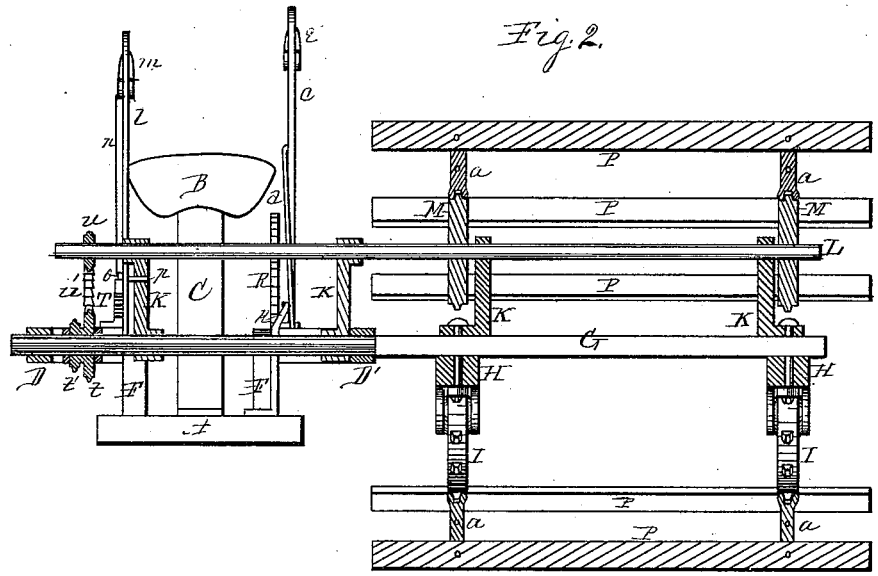
Figure 5:
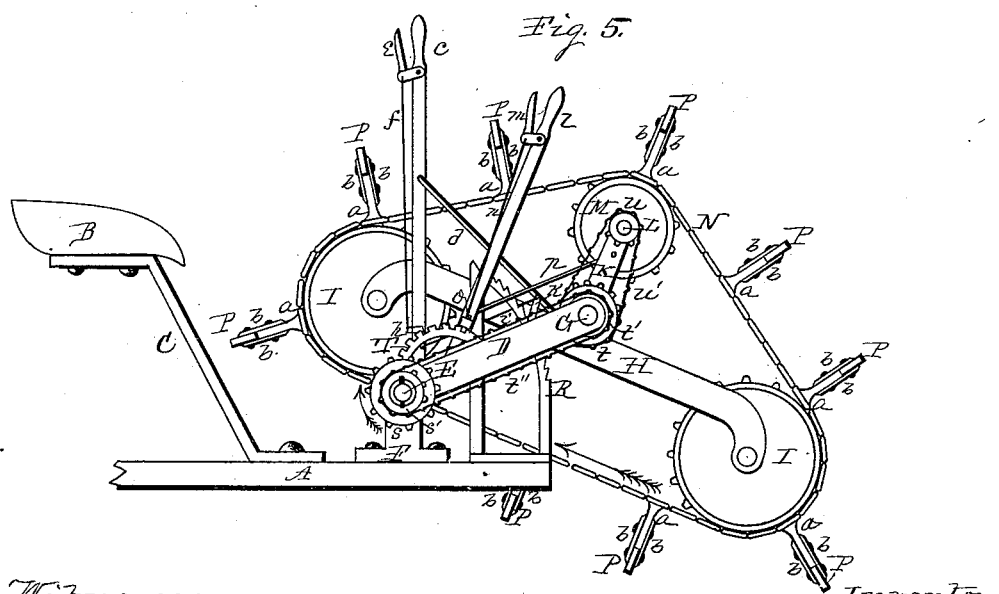

In the accompanying drawings, making part of this specification, Figure 1 is a plan view of my improved reel. Fig. 2 is a lengthwise vertical central section on dotted line *x x* on Fig. 3, as seen from the front. Fig. 3 is an end elevation showing the reel in its lowest position. Fig. 4 is an end elevation with reel elevated; Fig. 5, an end elevation with reel at medium height and tipped downward in front. Fig. 6 is a transverse vertical section on dotted line *y* on Fig. 1.

In the several figures, A represents a seat-support of the usual bench form, which in harvesting-machines employing inclined elevators is usually placed on the inclined grain side thereof, immediately outside of the driving-wheel end of the cutters and at a suitable elevation. On this bench-formed support the driver's seat B is supported, preferably on a spring-support, C, in the usual manner.

At D and D' are represented reel-supporting arms of suitable curving form, having the rear ends securely fixed to a shaft, E, which is supported to oscillate in bearings F, rising from the seat-support A. The forward end portions of the reel-supporting arms D and D' are of outward-curving form to receive the reel-supporting shaft G, which is mounted therein in suitable bearings to permit of an oscillatory movement of the shaft. This reel-supporting shaft G, from its connection with the supporting-arms D D', extends in a plane above the cutters in lengthwise direction thereof and substantially parallel thereto.

At H are represented sprocket-wheel-supporting arms fixed at their centers to the reel-supporting shaft at proper intervals and at right angles thereto.

At I are represented sprocket-wheels supported to revolve within the slotted ends of the supports H on suitable journals supported in the ends of the wheel-supporting arms.

At K are represented bracket-supports fixed at proper intervals to the reel-supporting shaft. The upper ends of these bracket-supports K are provided with bearings in which a reel-driving shaft, L, is mounted to revolve in a plane substantially parallel to the reel-supporting shaft.

At M are represented sprocket-wheels fixed upon the reel-driving shaft L, one in the vertical plane of each pair of sprocket-wheels I, in their respective arm-supports H.

At N are represented chain-belts having a link construction to engage the sprockets of the several wheels I and M, on each set of which one of these chains is placed. These chain-belts N, at proper intervals, are provided with a link having a projection, *a*, extending at right angles to the link outward.

At P are represented reel-bats of ordinary construction, placed in the lengthwise direction of the reel-shaft, and having their end portions fixed to the outward-projecting arms *a* of the chain-belt links by means of suitable battens, *b*, placed on the sides of the projecting arms and reel-bats, to which they are securely fixed by means of screw bolts or rivets passed through the parts.

At *c* is represented a raising and lowering lever fixed to the rear end of the reel-supporting arm D', and a brace, *d*, connects its upper end with the forward portion of the supporting-arm.

At *e* is represented a thumb-lever having a pivotal connection with the upper end of raising and lowering lever; and this thumb-lever *e* is connected, by means of a link, *f*, to a bell-crank lever, *h*, having a pivotal connection with the lower end portion of the raising and lowering lever. The bell-crank lever *h*, by means of a link, *i*, is connected to a spring-actuated pawl, *k*, pivoted to the reel-supporting arm in such position thereon that the pawl will engage the teeth of a segment-ratchet, R, fixed to the forward end portion of the seat-support. By this arrangement it will be seen that the reel may be raised or lowered to the positions shown in Figs. 3, 4, and 5, or to any other intermediate position within the limits of the adjustment, and supported in any such position by means of the pawl-and-ratchet mechanism.

At $l$ is represented a reel-tipping lever having a pivotal connection with the reel-supporting arm D.

At $m$ is represented a thumb-lever having a pivotal connection with the hand portion of the tipping lever, and by means of a link, $n$, is connected with a spring-actuated bolt, $o$, supported on the lower end portion of the lever in position thereon to engage the teeth of a toothed segment, T, fixed to the reel-supporting arm concentric with the pivotal connection of the lever with the support.

At $p$ is represented a connecting-link having a pivotal connection with the tipping lever $l$ and with one of the bracket-supports K of the reel-driving shaft, in such a manner that the back-and-forth movement of the tipping lever will impart an oscillatory movement to the reel-supporting shaft and to the reel mounted thereon, one position of which is shown in Fig. 5. From this construction and arrangement of these parts it will be seen that the reel can be tipped in such a manner as to depress or elevate either the front or the rear to any position within the limits of the adjustment, and be held in any adjusted position by means of the pawl-and-ratchet mechanism.

At $s$ and $s'$ are represented sprocket-wheels mounted on a hub bored to receive the projecting end of the shaft E of the reel-supporting arms, on which they are mounted to revolve. Of these the sprocket-wheel $s$ is the driver, and is designed to connect with any suitable portion of the harvester movement by means of a chain-belt or otherwise.

At $t$ and $t'$ are represented sprocket-wheels mounted upon a sleeve fitted to receive the reel-supporting shaft G to revolve thereon.

At $t''$ is represented a chain-belt mounted upon the sprocket-wheels $s'$ and $t'$.

At $u$ is represented a sprocket-wheel fixed upon the reel-driving shaft L. This sprocket-wheel $u$ is connected with the sprocket-wheel $t$ by means of a chain-belt, $u'$. From this system of sprocket-wheels and chain-belt connection it will be seen that if the driving-wheel $s$ is made to revolve in the direction indicated by the arrow, motion will be transmitted through the sprocket-wheel and chain-belt train to the reel, causing the chain-belt carrying the reel-bats to move in the direction of the arrows.

From the foregoing it will be seen that the construction and arrangement of my improved reel is such that by means of the detent-lever and notched-segment arrangement it is completely under the control of the driver mounted in his seat to raise, lower, and tip the reel in any position and to any extent within the limits of the adjustments, to adapt the reel to the conditions of the grain, to bring it in the best possible manner to the cutters, and deposit the cut grain upon the platform in the best manner.

I claim as my invention—

1. The combination, with a seat-support, of reel-supporting arms having a pivotal connection therewith, and capable of an up-and-down movement on their pivotal support, a reel-supporting shaft capable of an oscillatory movement in its connection with the reel-supports, and provided with bracket-supports for the reel-driving shaft, substantially as and for the purpose set forth.

2. The herein-described reel-frame, consisting of a reel-supporting shaft, transverse sprocket-wheel-supporting arms fixed to the shaft, a driving-shaft, and shaft-supporting brackets fixed to the reel-supporting shaft, these several parts constructed and arranged substantially as and for the purpose set forth.

3. The combination, with the herein-described reel-frame, consisting of the reel-supporting shaft, the transverse arms, vertical brackets, and driving-shaft, of sprocket-wheels supported in the transverse arms, sprocket-wheels mounted upon the driving-shaft in the vertical plane of the wheels in the transverse arms, and chain-belts with reel-bats connected therewith, mounted upon the sprocket-wheels, substantially as and for the purpose set forth.

4. The combination, with a seat-support, of reel-supporting arms, and a shaft, E, upon which the latter are pivoted, the reel-supporting shaft, a reel-driving shaft supported in brackets projecting from the reel-supporting shaft, a power-wheel mounted on the shaft E, a gear-train and belt, a lever having a link-connection with the supports of the driving-shaft, and ratchet-and-detent mechanism, substantially as set forth.

HOWARD H. HICKS.

Witnesses:
JACOB BEHEL,
A. O. BEHEL.